No. 854,869. PATENTED MAY 28, 1907.
L. H. BRINKMAN.
FLANGED PIPE.
APPLICATION FILED JULY 5, 1906.
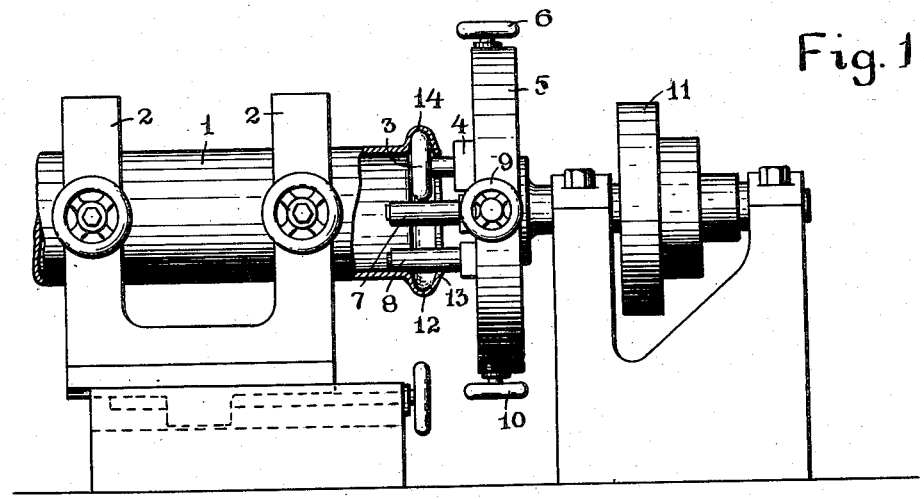
Fig. 1
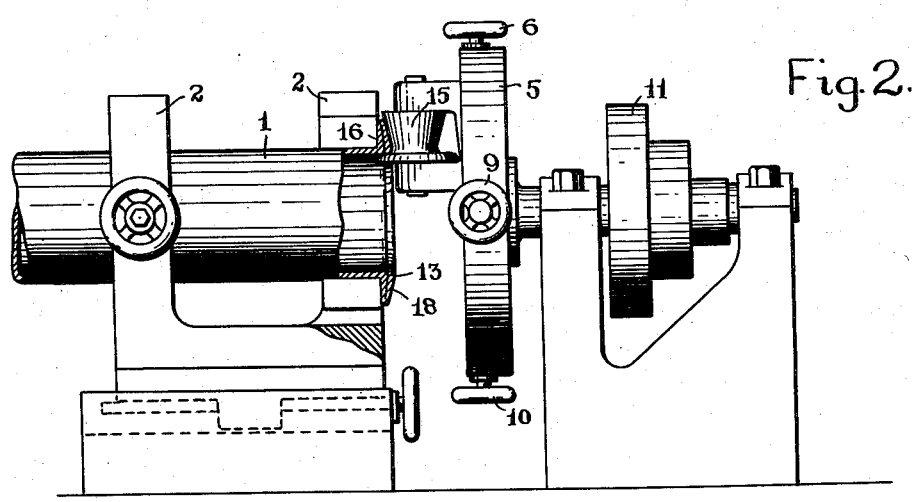
Fig. 2.
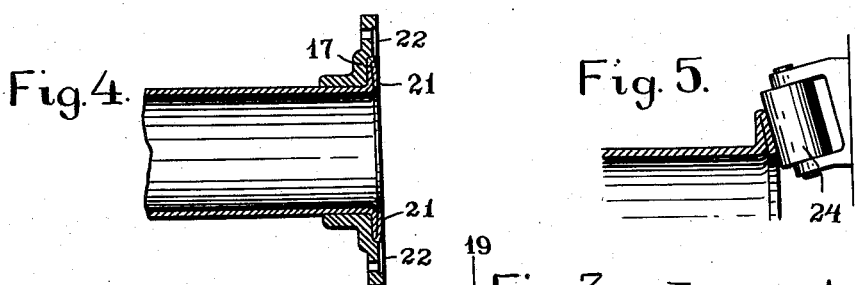
Fig. 4. Fig. 5.
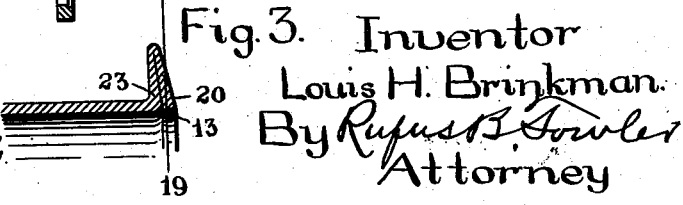
Witnesses
Roy D. Tolman.
Penelope Cumberbach.
Fig. 3. Inventor
Louis H. Brinkman.
By Rufus B. Fowler
Attorney

UNITED STATES PATENT OFFICE.

LOUIS H. BRINKMAN, OF HARTFORD, CONNECTICUT, ASSIGNOR TO WHITLOCK COIL PIPE COMPANY, OF WEST HARTFORD, CONNECTICUT, A CORPORATION OF CONNECTICUT.

FLANGED PIPE.

No. 854,869.  Specification of Letters Patent.  Patented May 28, 1907.

Application filed July 5, 1906. Serial No. 324,813.

*To all whom it may concern:*

Be it known that I, LOUIS H. BRINKMAN, a citizen of the United States, residing at Hartford, in the county of Hartford and State of Connecticut, have invented a new and useful Improvement in Flanged Pipes, of which the following is a specification accompanied by drawings, forming a part of the same and illustrating the nature and character of my present improvement, in which—

Figure 1 represents the first step employed in producing a flange on the end of a pipe according to my invention, and consisting in producing a semicircular expansion by which a section of the pipe near the end is reduced in thickness. Fig. 2 represents the method of compressing the semicircular expansion to form a flanged end. Fig. 3 is a diagrammatic view representing the plane upon which the flange is faced to correspond with the face of the connecting collars by which the flanged ends of connected pipe are united. Fig. 4 represents a completed flanged pipe with a collar applied thereto, and Fig. 5 represents a modification in the mechanism for compressing the flange.

My present invention relates to that class of flanged pipes in which a doubled flange is formed upon the end of a pipe, and the object of my invention is to provide a flange doubled upon itself and which can be faced to present contacting surfaces at right angles to the axis of the pipe without unduly weakening the flange.

In carrying out my invention I first expand the pipe, which has preferably been previously heated by any suitable means, such as that illustrated in Fig. 1, by which I form a semicircular expansion or bead around the pipe and near one end. I accomplish this result in the present instance by securely holding the pipe 1 in clamps 2, 2, and subjecting the end of the pipe to the expanding action of a roll 3, having a semicircular periphery and carried upon a stud held in a block 4, capable of a radial movement in a rotating face plate 5 by means of a screw operated by a hand wheel 6. To prevent the distortion of the pipe I insert within it rolls, such as 7 and 8, carried by the face plate 5 and in proper position to contact with the interior of the pipe and serve to preserve its cylindrical form, said rolls 7 and 8 being radially adjusted in the face plate by means of screws and hand wheels 9 and 10.

As rotary motion is given to the face plate 5 by means of a belt pulley 11 the expanding roll 3 is gradually pressed against the interior of the pipe by moving the block 4 outward by means of the hand wheel 6, causing a semicircular bead 12 to be formed in the pipe at such a distance from the end of the pipe that the inturned edge 13 will coincide with the interior of the pipe. The expansion of the pipe to form a semicircular bead gradually reduces the thickness of the metal in the bead, the reduction in thickness corresponding to the amount of expansion, and gradually increasing from the periphery of the pipe outward, the metal being thinnest at the point 14 or at the outside of the bead, and gradually increasing in thickness in each direction, the edge 13 remaining substantially the same thickness as the original thickness of the pipe. After expanding the pipe as described, I next compress the semicircular bead by applying pressure to the edge 13 by means of a compressing roll 15 in order to crowd the two sides of the semicircular bead together, as shown in Fig. 2, the pressure against the flange exerted by the roll 15 being received by a collar or clamp 2 surrounding the pipe and abutting against the rear side of the flange.

The face 16 of the clamp 2 is preferably at right angles to the axis of the pipe in order to bring the rear side of the flange in a plane at right angles to the axis of the pipe to receive a coupling collar 17, Fig. 4. The periphery of the compressing roll 15 is tapered, as shown in Fig. 2, the outer end being sufficiently larger than the inner end to compensate for the difference in thickness between the outer and inner edges of the compressed flange, said difference in thickness being due to the reduction in thickness of the metal caused by the expansion of the semicircular bead 12. By the compression of the flange as shown in Fig. 2, the rear side of the flange is crowded against the wall of the clamp 2 and brought into a plane at right angles with the axis of the pipe, while the opposite face 18 of the flange is at an oblique angle to the axis of the pipe. At the next operation I face the oblique side 18 of the flange upon a plane at right angles to the axis of the pipe, as indicated by the line 19—19, Fig. 3. I remove a sufficient amount of metal as at 20, Fig. 3, from the thick edge 13 of the flange to provide a sufficient bearing surface lying in a plane at right angles to the axis of the pipe and forming the contacting surface 21 of the flange, said contacting surface 21 being parallel with a face 22 of the clamping collar 17. When two adjacent pipes are clamped together by collars 17 the pressure upon the contacting surface 21 is received by the base of the flange 23, Fig. 3, where the metal has not been materially reduced in thickness, thereby giving greater strength to the joint. As the edge 13 remains the original thickness of the pipe, sufficient metal is provided for facing the pipe and providing a contacting surface of the desired area by cutting away only a portion of the inturned member of the flange.

Instead of using a tapered or conical roll, as shown at 15, Fig. 2, I can compress the semispherical bead into a doubled flange by means of a cylindrical roll 24, having its axis placed at an oblique angle to the axis of the pipe, as shown in Fig. 5.

I do not wish to confine myself to any particular apparatus or specific method of manufacture as I am aware that these may be changed without departing from the scope of my invention.

I claim,

1. As an article of manufacture, a pipe having at its end a flange formed by turning the pipe outwardly and then inwardly upon itself to form a double flange with the metal of the outwardly and inwardly turned members of the flange gradually reduced in thickness toward the outer edge of the flange, with the outer side of the outwardly turned member in a plane at substantially right angles to the axis of the pipe, and the outer side of the inwardly turned member at an oblique angle to the axis of the pipe, with a portion of the inwardly turned member of the flange faced in a plane at right angles to the axis of the pipe to form a contacting surface.

2. As an article of manufacture, a pipe having at its end an integral exterior flange, consisting of outwardly and inwardly turned members forming a double flange having the thickness of the outer edge of the flange less than its inner edge and having one side of the flange at substantially right angles to the axis of the pipe, and having the outer portion of opposite face oblique to the axis of the pipe, and the inner portion at right angles to the axis of the pipe.

3. As an article of manufacture, a pipe having at its end an exterior integral flange composed of outwardly and inwardly turned members compressed together, with the thickness of each member less at its outer edge than at its inner edge, and having the outer side of the outwardly turned member substantially at right angles to the axis of the pipe, and having the inner edge of the inwardly turned member faced to form a contacting surface at right angles with the axis of the pipe.

Dated this 2nd day of July, 1906.

LOUIS H. BRINKMAN.

Witnesses:
C. A. LILLIE,
H. E. WILCOX.